United States Patent [19]

Matczak

[11] Patent Number: 5,709,387
[45] Date of Patent: Jan. 20, 1998

[54] AXLE SEAL

[75] Inventor: Stanley E. Matczak, Ellington, Conn.

[73] Assignee: Seals-It, East Hartford, Conn.

[21] Appl. No.: 181,855

[22] Filed: Jan. 14, 1994

[51] Int. Cl.$^6$ .................................................. F16J 15/32
[52] U.S. Cl. ........................... 277/35; 277/37; 277/152; 277/165
[58] Field of Search .................... 277/35, 37, 39, 277/50, 58, 61, 135, 152, 165, 227

[56] References Cited

U.S. PATENT DOCUMENTS

| 3,408,084 | 10/1968 | Huling | 277/165 |
| 3,443,845 | 5/1969 | Walchle et al. | 277/227 |
| 3,601,417 | 8/1971 | Szepesvary | 277/165 |
| 3,612,546 | 10/1971 | Otto | 277/58 |
| 3,917,286 | 11/1975 | Loyd | 277/37 |
| 4,190,258 | 2/1980 | Arai et al. | 277/165 |
| 4,449,717 | 5/1984 | Kitawaki et al. | 277/152 |
| 4,819,854 | 4/1989 | Schmehr | 277/47 |
| 5,271,629 | 12/1993 | Dahlhaus et al. | 277/152 |

FOREIGN PATENT DOCUMENTS

| 0135655 | 6/1988 | Japan | 277/58 |
| 0247517 | 3/1947 | Sweden | 277/58 |

Primary Examiner—William A. Cuchlinski, Jr.
Assistant Examiner—John L. Beres
Attorney, Agent, or Firm—Fishman, Dionne, Cantor & Colburn

[57] ABSTRACT

An axle seal is presented. The axle seal is disposed about an automotive axle at the automotive differential to prevent leakage of lubricant from the differential. The axle seal comprises a rigid cylindrical body member having outer grooves receptive to o-ring seals to provide a seal between the differential and the body member which is mounted within an opening of the differential. The axle is attached to the differential and passes through an opening in the body member. The body member is chamfered at the opening to direct the axle to the center line during assembly. A step defining a recessed portion is formed within the opening of the body member where inner seals are disposed. The inner seals provide a seal between the axle and the body member and allow significant angular displacement of the axle from the center line without compromising the integrity of the seal between the body member and the axle or between the body member and the differential. The inner seals comprise two spaced apart seals bonded to a sleeve disposed in the recessed portion of the body member. Each seal tapers in thickness from the body member to a central opening, this opening being smaller in diameter than the axle passing therethrough to provide the necessary sealing tension.

12 Claims, 2 Drawing Sheets

AXLE SEAL

BACKGROUND OF THE INVENTION

This invention relates generally to seals. More specifically, this invention relates to an axle seal for use primarily with an automotive axle and differential.

Axle seals are known in the prior art. Such axle seals comprise a rigid cylindrical body member having outer grooves receptive to o-ring seals to provide a seal between the differential and the body member which is mounted within an opening of the differential. The axle is attached to the differential and passes through an opening in the body member. The body member is chamfered at the opening to direct the axle to the center line during assembly. A counter bore is formed within the opening of the body member where an inner seal is disposed. The inner seal provides a seal between the axle and the body member. However, this seal only provides for a limited amount of angular displacement of the axle from the center line, otherwise the seal between the body member and the axle is overcome and lubricant from the differential leaks out around the axle. This prior art inner seal comprises a cylindrically shaped seal mounted within the opening of the body member and having an extended portion exposed within another counter bore formed within the opening of the body member. The extended portion having a recess near the end thereof wherein a spring held. The opening of the seal is smaller in diameter than the axle passing therethrough. The spring provides addition tension in an attempt to maintain sufficient sealing between the seal and the axle when the axle is angularly displaced from the center line. However, during more extreme angular displacements lubrication from the differential leaks out from between the seal an the axle. Such extreme angular displacements are commonly encountered with automobiles used for racing, generally circle or oval track racing, during cornering.

SUMMARY OF THE INVENTION

The above-discussed and other drawbacks and deficiencies of the prior art are overcome or alleviated by the hub seal of the present invention. In accordance with the present invention an axle seal is disposed about an automotive axle at the automotive differential to prevent leakage of lubricant from the differential. The axle seal comprises a rigid cylindrical body member (generally comprised of aluminum) having outer grooves receptive to o-ring seals to provide a seal between the differential and the body member which is mounted within an opening of the differential. The axle is attached to the differential and passes through an opening in the body member. The body member is chamfered at the opening to direct the axle to the center line during assembly. A step defining a recessed portion is formed within the opening of the body member where inner seals are disposed. The inner seals provide a seal between the axle and the body member and allow significant angular displacement of the axle from the center line without compromising the integrity of the seal between the body member and the axle or between the body member and the differential. The inner seals comprise two spaced apart seals bonded to a sleeve disposed in the recessed portion of the body member. Each seal including a central opening which is smaller in diameter than the axle passing therethrough to provide the necessary sealing tension.

In contrast to the prior art, lubricant within the differential is held within the differential even during extreme angular displacements of the axle, such as encountered with automobiles used for racing, generally circle or oval track racing, during cornering. This is due to the use of multiple seals and the seals having central openings that are about thirty-five percent smaller in diameter than that of the axle passing therethrough. The opening diameter of the prior seal is about ten percent smaller in diameter than that of the axle passing therethrough.

Accordingly, the prior art problem of lubricant leaking from the differential during more sever angular displacements of the axle, such as encountered with automobiles used for racing, generally circle or oval track racing, during cornering, is avoided. The aforementioned prior art seal is not suitable for sufficiently resolving this prior art problem.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

Figure 1:
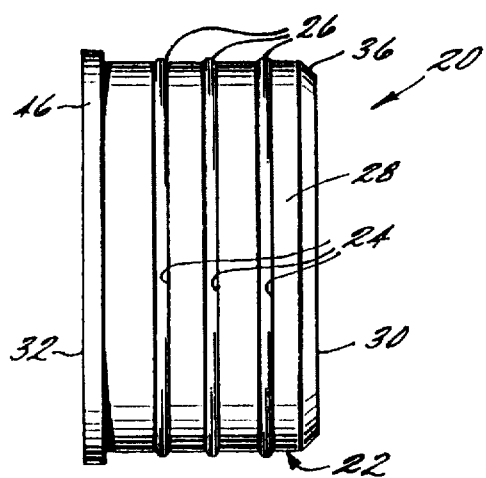
FIG. 1 is a side view of an axle seal in accordance with the prior art.
Figure 2:
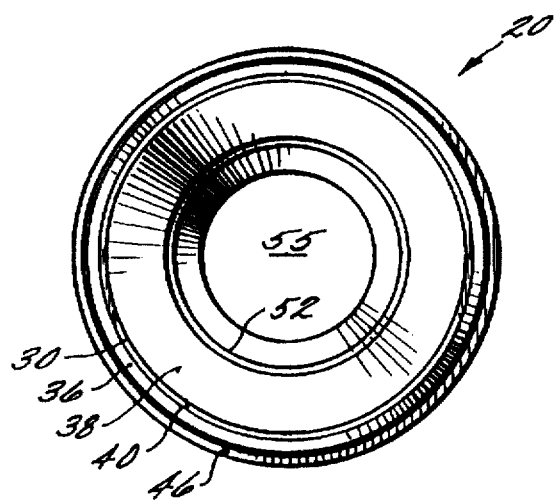
FIG. 2 is a first end view of the prior art axle seal of FIG. 1.
Figure 3:
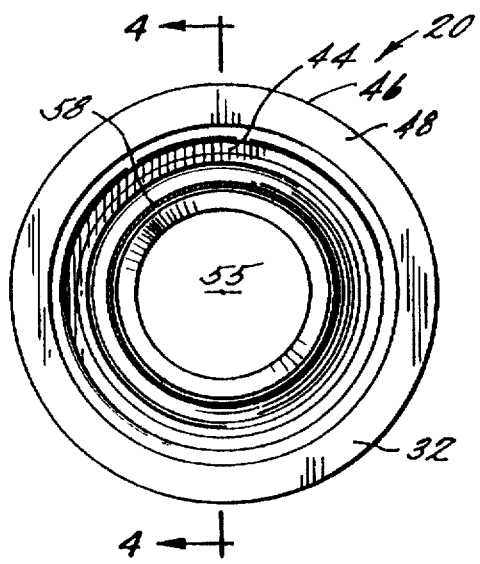
FIG. 3 is a second end view of the prior art axle seal of FIG. 1.
Figure 4:
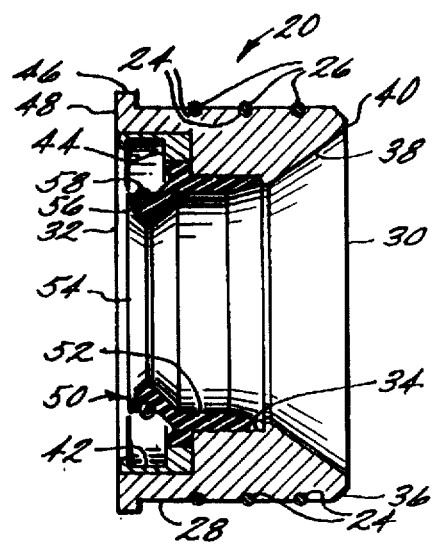
FIG. 4 is a view taken along the line 4—4 in FIG. 3.
Figure 5:
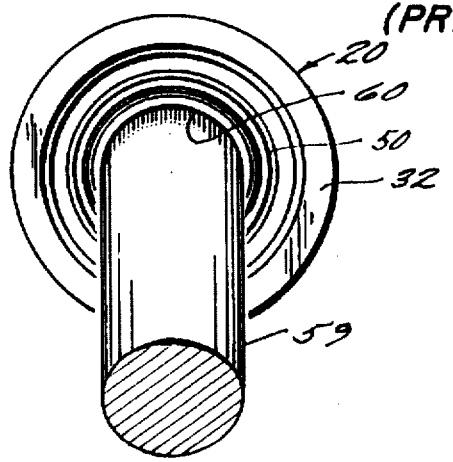
FIG. 5 is a end view of the prior art axle seal of FIG. 1 with an axle, partially shown, therethrough at an extreme angular displacement relative to the center line.
Figure 6:
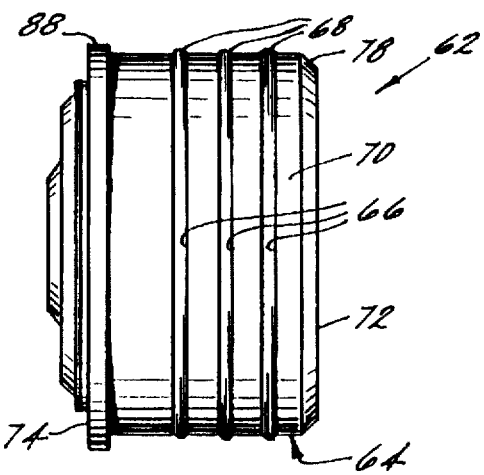
FIG. 6 is a side view of an axle seal in accordance with the present invention.
Figure 7:
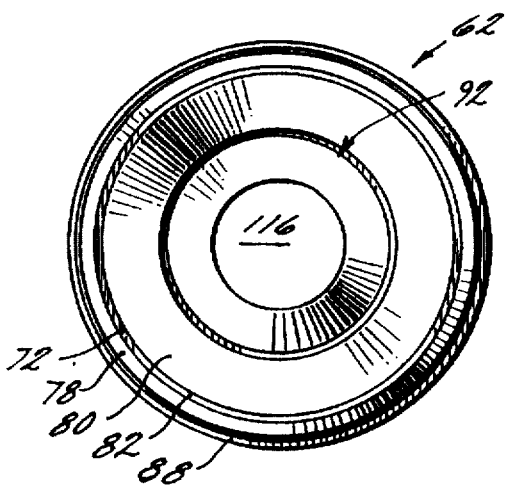
FIG. 7 is a first end view of the axle seal of FIG. 6.
Figure 8:
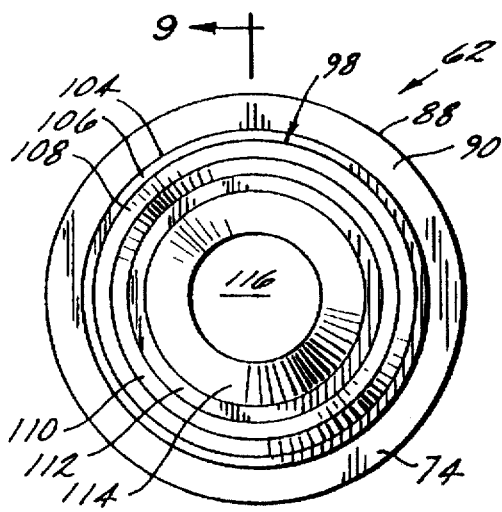
FIG. 8 is a second end view of the axle seal of FIG. 6.
Figure 9:
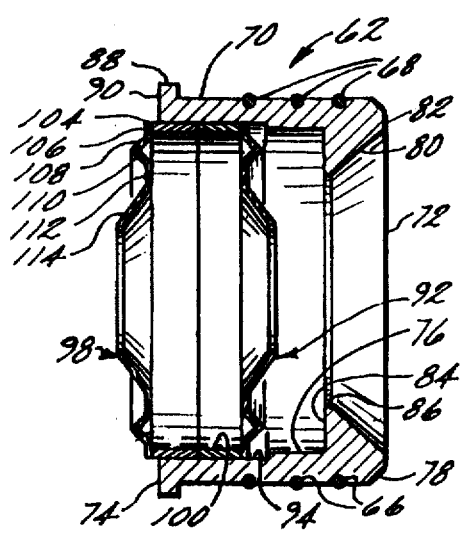
FIG. 9 is a view taken along the line 9—9 in FIG. 8.

Referring to prior art FIGS. 1–4, a prior art axle seal is shown generally at 20. Axle seal 20 comprises a rigid cylindrical body member 22 having outer grooves 24 circumferentially thereabout with o-ring seals 26 disposed therein to provide a seal between an automotive differential (not shown) and body member 22 which is mounted within an opening of the differential. An automotive axle is attached to the differential and passes through an opening in body member 22. Body member 22 comprises a cylindrical portion 28 having opposing ends 30 and 32 with an opening therethrough defined by a cylindrical inner surface 34. End 30 includes an outer chamfered (i.e., beveled) surface 36 and an inner chamfered surface 38 with a flat surface 40 therebetween. Surface 38 directs the axle to a center line (i.e., a line extending longitudinally through the center of the opening of member 22) during assembly. Surface 34 is stepped outwardly near end 32 where a member having surfaces 42 and 44 define an increased diameter of the opening at this end 32. End 32 further includes a flange 46 having an outer diameter greater than that of portion 28. Flange 46 is defined at end 32 by surface 48. A seal element 50 is secured within the opening by attaching seal element 50 to surfaces 34 and 44 of portion 28. Seal element 50 has a cylindrical portion 52 attached to surface 34 of portion 28. A sealing portion 54 extends from portion 52 into the increased diameter section of the opening (i.e., the area defined by surface 42). Sealing portion 54 increases in thickness from portion 34 of the sealing element to end 32, where an opening 55 is defined, by tapering of the inner surface of portion 54. The outer surface of sealing portion 54 includes an outer groove 56 circumferentially thereabout with a spring 58 disposed therein to provide additional tension in an attempt to maintain sufficient sealing between sealing portion 54 and an axle (not shown) when the axle is angularly displaced from the center line. Opening 55 of sealing portion 54 is smaller in diameter than an axle passing therethrough by about ten percent. However, sealing portion 54 only provides for a limited amount of angular displacement of an axle 59 from the center line, and during extreme angular displacement of the axle the seal established by sealing portion 54 between sealing portion 54 and the axle 59 is overcome leaving an opening 60, see FIG. 5, and lubricant from the differential leaks out around the axle. Such extreme angular displacements are commonly encountered with automobiles used for racing, generally circle or oval track racing, during cornering.

Referring to prior art FIGS. 6–9, an axle seal in accordance with the present invention is shown generally at 62. Axle seal 62 comprises a rigid cylindrical body member 64 having outer grooves 66 circumferentially thereabout with o-ring seals 68 disposed therein to provide a seal between an automotive differential (not shown) and body member 62 which is mounted within an opening of the differential. Body member 64 is preferably comprised of aluminum. An automotive axle is attached to the differential and passes through an opening in body member 64. Body member 64 comprises a cylindrical portion 70 having opposing ends 72 and 74 with an opening therethrough defined by a cylindrical inner surface 76. End 72 includes an outer chamfered (i.e., beveled) surface 78 and an inner chamfered surface 80 with a flat surface 82 therebetween. Surface 80 directs the axle to a center line (i.e., a line extending longitudinally through the center of the opening of member 64) during assembly. Surface 76 is stepped inwardly near end 72 forming surfaces 84 and 86 which define a decreased diameter of the opening at this end 72. End 74 includes a flange 88 having an outer diameter greater than that of portion 64. Flange 88 is defined at end 74 by surface 90. A first seal element 92 is secured within a recessed or stepped portion 94 of the opening by attaching seal element 92 to a first end surface of a sleeve 100 secured in recess 94, for example, by sweat fit or other known means. A second seal element 98 is secured near end 74 by attaching seal element 98 to a second end surface of sleeve 100. Seal elements 92 and 98 are preferably comprised of a polymer such as nitrile or neoprene as well as plastics or other suitable sealing materials (e.g., rubber).

Each seal element 92, 98 is defined from its outer circumferential edge 104 by a first flat portion 106 followed by a first inclined portion 108 with an opposing second inclined portion 110 depending therefrom. The first flat portion 106 of each seal element 92, 98 is fused or otherwise bonded to sleeve 100 by any known method (e.g., adhesive bonding, chemical bonding or mechanical means of attachment). A second flat portion 112 extends from portion 110 followed by a third, more pronounced, inclined portion 114 (i.e., a conically shaped portion) terminating in a central opening (or aperture) 116. Portions 108 and 110 are thinner than portions 106, 112 and 114 to allow the seals to take up axle oscillations/vibrations, whereby portion 114 is not subject to such oscillations/vibration and thereby maintaining seal integrity. Opening 116 of portion 114 is smaller in diameter than an axle passing therethrough by about thirty-five percent. It will be appreciated that the contacting portion of the seal (i.e., portion 114) is substantially thinner than the contacting portion of the aforementioned prior art seal, whereby rotational friction between the axial and the seal are significantly reduced. The chamber defined between seal elements 92 and 98 may have a lubricant deposited therein to further reduce rotational friction and to improve seal integrity. Heretofore it was believed that a thicker and thereby harder seal would provide a better seal. However, when pressure is applied to one side of the prior art seal the opposing side does not follow due to the thickness and rigidity of such seals. The seals of the present invention do not suffer from this problem, since the opposing side of the seal is not required to follow the side of the seal under force in order to maintain the seal.

Figure 10:
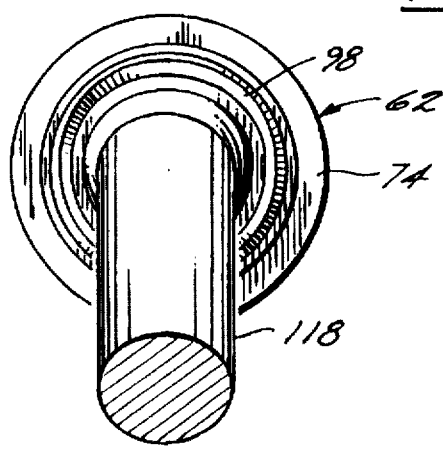
FIG. 10 is a end view of the axle seal of FIG. 6 with an axle, partially shown, therethrough at an extreme angular displacement relative to the center line.

Referring to FIG. 10, each seal element 92, 98 provides for a significant amount of angular displacement of an axle 118 from the center line without loss of the seal established between the seal elements 92, 98 and the axle 118, whereby lubricant is maintained in the differential. Such extreme angular displacements are commonly encountered with automobiles used for racing, generally circle or oval track racing, during cornering.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An axle seal comprising:
    a generally cylindrical member having opposing ends with an opening longitudinally therethrough; and
    first and second spaced apart seal means secured to said cylindrical member, each of said first and second seal means having an aperture therethrough, said apertures in said first and second seal means being in general alignment with said opening in said cylindrical member, each of said apertures in said first and second seal means having a diameter less than a diameter of said opening in said cylindrical member, said diameter of each of said apertures in said first and second seal means being about thirty-five percent smaller than a diameter of an axle passing therethrough, said first and second seal means for sealingly engaging an axle passing through said apertures in said first and second seal means, each of said first and second seal means comprising,
        an outer first generally flat portion,
        a first inclined portion depending from said first flat portion,
        a second opposing inclined portion depending from said first inclined portion,
        a second generally flat portion depending from said second inclined portion, and
        a third inclined portion depending from said second flat portion and terminating at said aperture.

2. The axle seal of claim 1 wherein said cylindrical member further comprises:
    at least one outer circumferential recess in said cylindrical member; and
    an o-ring disposed in said recess.

3. The axle seal of claim 1 wherein said cylindrical member further comprises:

a first end thereof having an outer chamfered surface, an inner chamfered surface and a flat surface therebetween, wherein said inner chamfered surface directs an axle to a center line during installation of said axle seal on the axle, said center line extending longitudinally through the center of said opening of said cylindrical member.

4. The axle seal of claim 1 further comprising:

a sleeve secured within said opening, said sleeve having first and second ends, wherein, said first seal means is secured to said first end of said sleeve, and said second seal means is secured to said second end of said sleeve.

5. The axle seal of claim 1 wherein each of said first and second seal means further comprises:

a generally conically shaped portion about said aperture.

6. The axle seal of claim 1 wherein said first and second inclined portions are thinner than said third inclined portion whereby vibrations are absorbed by said first and second inclined portions and reduced at said third inclined portion.

7. An axle seal comprising:

a generally cylindrical member having opposing ends with an opening longitudinally therethrough; and seal means secured to said cylindrical member, said seal means having an outer first generally flat portion, a first inclined portion depending from said first flat portion, a second opposing inclined portion depending from said first inclined portion, a second generally flat portion depending from said second inclined portion and a third inclined portion depending from said second flat portion and terminating at an aperture, said aperture in said seal means being in general alignment with said opening in said cylindrical member, said aperture in said seal means having a diameter less than a diameter of said opening in said cylindrical member, said diameter of said aperture in said seal means being about thirty-five percent smaller than a diameter of an axle passing therethrough, said seal means for sealingly engaging an axle passing through said aperture in said seal means.

8. The axle seal of claim 7 wherein said first and second inclined portions are thinner than said third inclined portion whereby vibrations are absorbed by said first and second inclined portions and reduced at said third inclined portion.

9. The axle seal of claim 7 wherein said cylindrical member further comprises:

at least one outer circumferential recess in said cylindrical member; and an o-ring disposed in said recess.

10. The axle seal of claim 7 wherein said cylindrical member further comprises:

a first end thereof having an outer chamfered surface, an inner chamfered surface and a flat surface therebetween, wherein said inner chamfered surface directs an axle to a center line during installation of said axle seal on the axle, said center line extending longitudinally through the center of said opening of said cylindrical member.

11. The axle seal of claim 7 wherein said seal means is secured to said cylindrical member within said opening of said cylindrical member.

12. The axle seal of claim 7 wherein said seal means is secured to said cylindrical member at about a second end thereof of said cylindrical member.

* * * * *